Oct. 30, 1945.     P. A. NOXON     2,387,938
RATE OF TURN METER AND BANK INDICATOR
Filed April 17, 1942     2 Sheets-Sheet 1
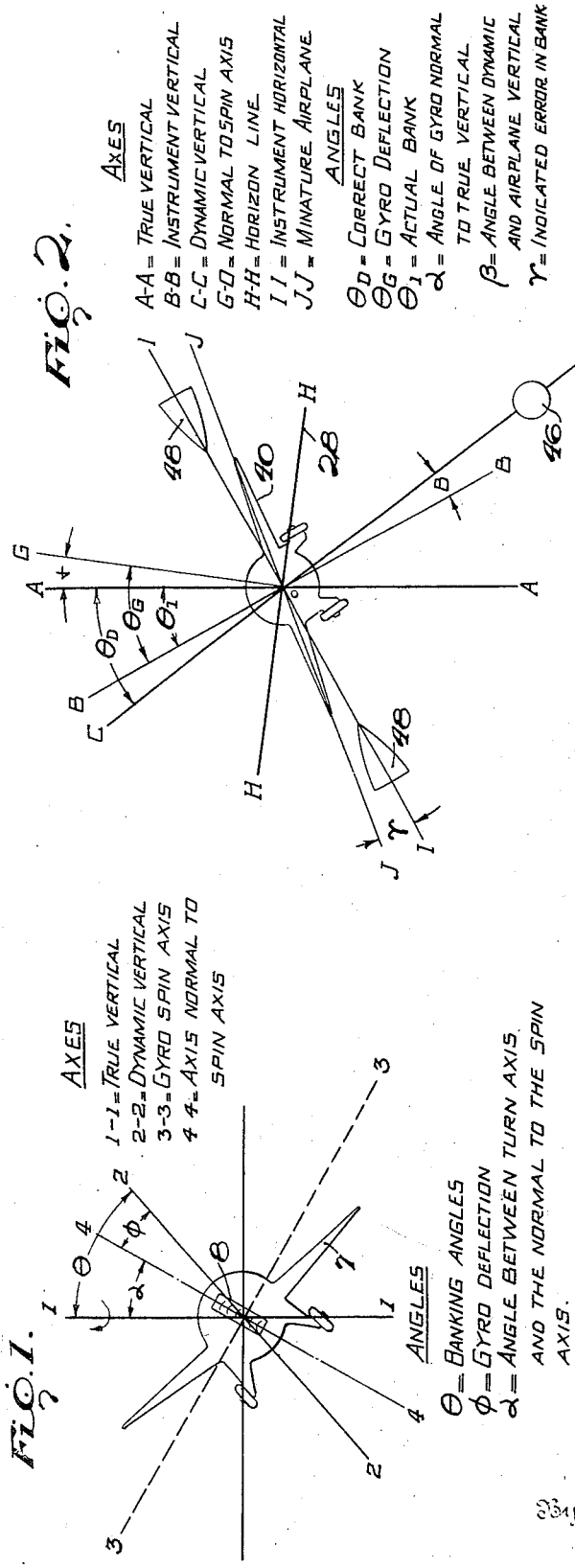
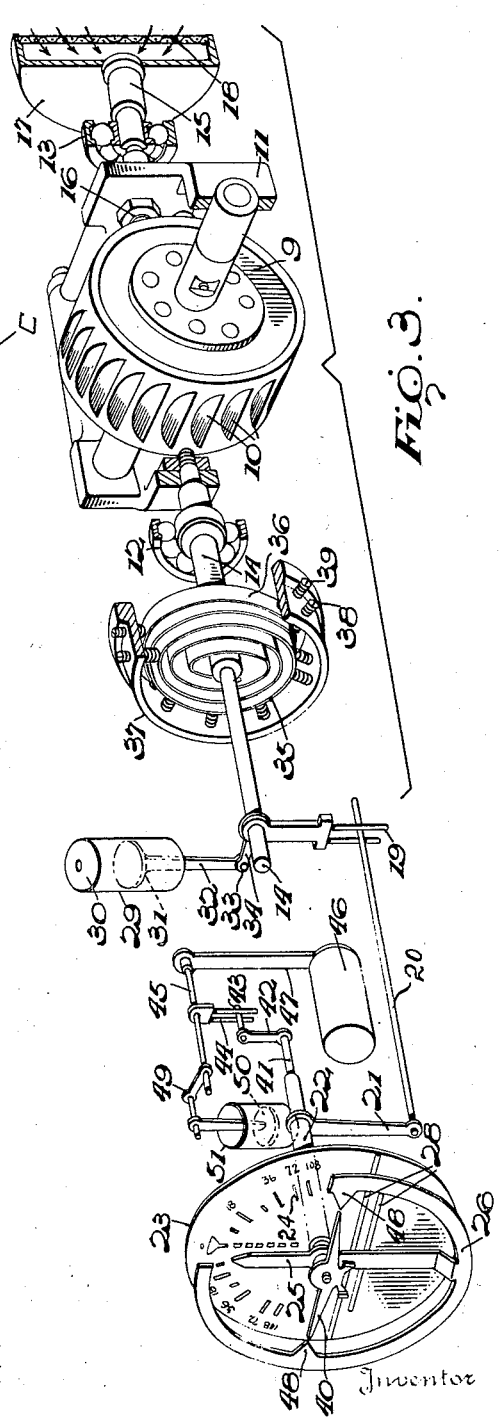
Paul A. Noxon.
By Stephen Cerstvik
Attorney Oct. 30, 1945.   P. A. NOXON   2,387,938
RATE OF TURN METER AND BANK INDICATOR
Filed April 17, 1942   2 Sheets-Sheet 2

STRAIGHT LEVEL FLIGHT.

RIGHT TURN — CORRECT BANK

LEFT TURN — TOO FLAT.

Inventor
Paul A. Noxon.
By Stephen Cerstvik.
Attorney

Patented Oct. 30, 1945

2,387,938

UNITED STATES PATENT OFFICE 2,387,938

RATE OF TURN METER AND BANK INDICATOR

Paul A. Noxon, Tenafly, N. J., assignor to Bendix Aviation Corporation, Bendix, N. J., a corporation of Delaware Application April 17, 1942, Serial No. 439,425

11 Claims. (Cl. 33—204)

The present invention relates to a rate of turn responsive device and/or indicator for aircraft and the like, and more particularly to a gyroscopic rate of turn meter combined with a pendulous bank indicator.

One of the objects of the present invention is to provide a novel gyroscopic rate of turn responsive device and/or indicator for measuring and/or indicating the rate of turn of an aircraft and the like about one of its axes, with a substantially higher degree of accuracy than was heretofore possible with prior art gyroscopic rate of turn indicators of this type. Specifically, the invention constitutes an improvement in gyroscopic rate of turn indicators of the type described and claimed in the patent to E. A. Sperry, No. 1,407,491, and the patent to J. B. Henderson, No. 1,894,038.

Another object of the invention is to provide a novel gyroscopic rate of turn indicator, hereinafter referred to as a "turn meter" or "rate of turn meter" for accurately measuring and/or indicating the rate of turn of an aircraft about its vertical axis.

Another object is to provide, in an aircraft rate of turn responsive device of the type having a two-degree-of-freedom gyroscope mounted for precession about an axis at right angles to the axis about which the rate of turn of the aircraft is to be measured and/or indicated, novel means for yieldingly opposing said precession whereby said precession becomes an accurate measure of the rate of turn of said aircraft.

A further object of the invention is to provide, in a gyroscopic rate of turn responsive device of the class described, novel means producing an opposing torque which is a function of the tangent of the angle of precession of the gyroscope for opposing said precession, whereby said precession becomes an accurate measure of the rate of turn.

Still another object of the invention is to provide a novel combined aircraft turn meter and bank indicator for indicating the actual attitude of the aircraft laterally with respect to the horizon and for also indicating the correct attitude of the aircraft for straight flight and while turning.

A still further object is to provide a novel combined aircraft turn meter and bank indicator in which the indications of the attitude of the aircraft for straight flight and while turning are presented to the pilot in a manner promoting instinctive comprehension of the indications on the part of the pilot.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for purposes of illustration only, and are not to be construed as defining the limits of the invention, reference being had to the appended claims for this purpose.

In the drawings, wherein like reference characters refer to like parts in the several views, Fig. 1 is a diagram for the purpose of aiding in the understanding of the invention and showing the angular relation of the precession axis of the gyroscope and the vertical axis of the craft with respect to the true vertical during a turn of the aircraft;

Fig. 2 is a diagram similar to Fig. 1 and showing the angular relation of the precession of the gyro, the axis of the bank pendulum and the vertical axis of the craft with respect to the true vertical during a turn of the aircraft at an incorrect banking angle;

Fig. 3 is an exploded isometric view, with some portions broken away, of one form of combined rate of turn meter and bank indicator embodying the present invention;

Figure 4:
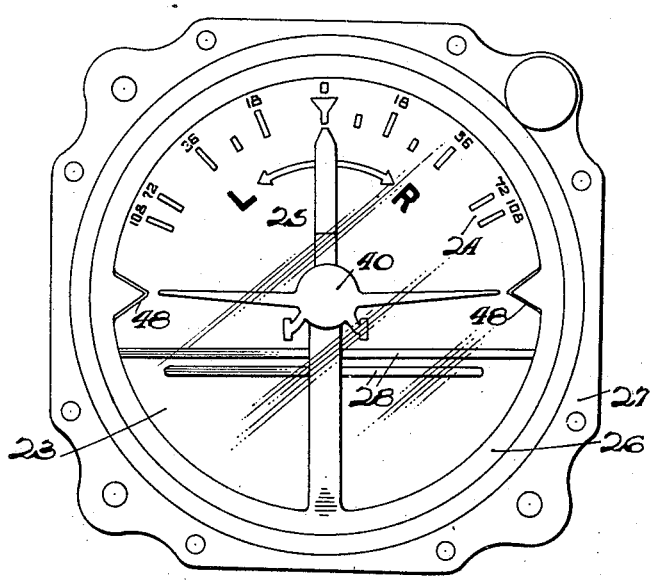
Fig. 4 is a front view of the face of the instrument of Fig. 1, showing the indication presented thereby during straight level flight.

The invention consists substantially in the construction, combination, location and relative arrangement of parts for obtaining the results desired in accordance with the foregoing objects, as will be more fully hereinafter set forth in the specification, as shown in the drawings by way of example, and as finally pointed out in the claims.

In order to explain the principles involved in the present invention, it is believed essential to review the fundamental theory of the gyroscopic rate of turn indicator in which a gyro rotor is mounted for two-degrees-of-freedom, i. e., the rotor is mounted in a gimbal ring for spinning about an axis at right angles to the axis about which the craft is to turn, and the gimbal is mounted for precession about an axis mutually perpendicular to the spin axis and the axis of turn, the precession of the gyroscope being opposed by some suitable yielding means such as a centralizing spring or springs so that said precession becomes a function of the rate of turn of the craft.

The precessional torque of the gyroscope is given by the following equation:

(1) $$T_p = \frac{I_s}{g}\omega_s\omega \cos \alpha$$

where $T_p$ = Precessional torque.
$I_s$ = Moment of inertia of rotor about spin axis.
$g$ = Gravitational constant.
$\omega_s$ = Angular velocity of rotor about spin axis.
$\omega$ = Angular velocity or rate of turn of system about axis of reference.
$\alpha$ = Angle between axis of reference and the normal to the plane of the spin and gimbal axes.

It can be seen that Equation 1, in addition to the variable $\omega$ (the quantity to be measured), contains two other variables, namely, $\omega_s$ and $\alpha$. Therefore, in order to obtain an accurate measurement of $\omega$ it is necessary to fix the value of $\omega_s$ and make $\alpha$ a known function of $\omega$ or make it constant also.

Various methods and means are known for making the gyro speed ($\omega_s$) constant and any of them can be readily used. See, for example, the patent to W. A. Reichel, No. 2,249,914, dated July 22, 1941.

The most advantageous method to treat $\alpha$ will now be developed mathematically with reference to Fig. 1 of the drawings, wherein the miniature airplane 7 shows the attitude of an aircraft during a turn about axis 1—1, and the gyro rotor is shown at 8 which spins on axis 3—3.

Let it be assumed that the craft 7 is turning to the right about axis 1—1 as shown by the arrow, and that the craft is banked at the proper angle for the rate at which it is turning. Its vertical axis will then coincide with the dynamic vertical axis 2—2, and it is seen that the angle $\alpha$ is equal to the banking angle $\theta$ minus the gyro deflection angle $\phi$, i. e. $\alpha = \theta - \phi$.

Substituting $(\theta - \phi)$ for $\alpha$ in Equation 1 we get (2) $$T_p = \frac{I_s}{g}\omega_s\omega \cos(\theta - \phi)$$

The correct banking angle $\theta$ is given by the following equation:

(3) $$\theta = \tan^{-1}\frac{V\omega}{g}$$

or $$\tan \theta = \frac{V\omega}{g}$$

where V = airspeed.

It is evident from the above equations that if we assumed the airspeed (V) to be constant and ($\theta$) the correct angle of bank, we could calibrate the gyro for rate of turn, but changes in airspeed do occur and introduce errors which manifest themselves by changing the torque ($T_p$) in Equation 2.

In accordance with the present invention it has been found that the most practical method of attack of the problem is to fix the nature of $(\theta - \phi)$ in Equation 2 or of ($\alpha$) in Equation 1 so that a unit change of ($\alpha$) will produce a minimum effect on the precessional torque, the measure of such change being $$\frac{dT_p}{d\alpha}$$

Now, by differentiating Equation 1 as follows:

(1) $$T_p = \frac{I_s}{g}\omega_s\omega \cos \alpha$$

$$dT_p = -\frac{I_s}{g}\omega_s\omega \sin \alpha \, d\alpha$$

we get (4) $$\frac{dT_p}{d\alpha} = -\frac{I_s}{g}\omega_s\omega \sin \alpha$$

In order for $$\frac{dT_p}{d\alpha}$$

to be a minimum, the angle ($\alpha$) must be zero.

Now, if the angle ($\alpha$) is to be zero, then $$\theta - \phi = 0$$

or (5) $$\theta = \phi$$

This indicates that the centralizing means or spring which opposes the precession of the gyro must be so designed that the deflection angle ($\phi$) of the gyro for a given rate of turn will equal the banking angle ($\theta$) for that rate of turn.

Now, when ($\alpha$) is zero in Equation 1 the precession torque of the gyro will be (6) $$T_p = \frac{I_s}{g}\omega_s\omega$$

but to centralize the gyro the opposing torque ($T_s$) of the centralizing means or spring must be equal to the precessional torque ($T_p$) of the gyro for every rate of turn and, therefore, $$T_s = \frac{I_s}{g}\omega_s\omega$$

or $$\omega = \frac{T_s g}{\omega_s I_s}$$

Since $\theta = \phi$, then from Equation 3 we get (7) $$\phi = \tan^{-1}\frac{V\omega}{g}$$

or $$\tan \phi = \frac{V\omega}{g}$$

Substituting for ($\omega$) in Equation 7 we get $$\tan \phi = \frac{V}{g} \cdot \frac{T_s g}{\omega_s I_s}$$

and (8) $$T_s = \frac{\omega_s I_s}{V}\tan \phi$$

In other words, the spring or centralizing means must have a tangent-law torque characteristic.

It is apparent that while calibration will be made for a given airspeed and perfect bank, some variation in these quantities will be present in actual practice with the result that ($\alpha$) will not be actually zero but will be some small angle.

Assuming a reasonable allowable error of 0.5%, then $$\frac{T_p}{T_s} = \frac{\text{actual torque}}{\text{torque when }(\alpha)\text{ is zero}} = .995$$

or $$\frac{\frac{I_s}{g}\omega_s\omega \cos \alpha}{\frac{I_s}{g}\omega_s\omega \cos 0} = \frac{.995}{1}$$

and, therefore, $$\cos \alpha = .995$$

and $$\alpha = 6° \text{ (approximately)}$$

Practically, this means that with a banking error of two degrees (2°) and with calibration at 175 miles per hour airspeed, the indications of the rate of turn gyro will be within one-half per cent (½%) of the true rate of turn for airspeeds from 150 to 200 miles per hour, or, flying at 175 miles per hour a banking error of six degrees (6°) can be made with the same small error in indication.

Referring now to Fig. 3 of the drawings, there is shown one form of gyroscopic rate of turn meter embodying the present invention and provided with centralizing means having the required tangent-law characteristic. As shown, the rate of turn meter comprises a gyroscope having an air-driven rotor 9 provided with peripheral buckets 10 and journalled in a gimbal frame 11 which is, in turn, journalled for precession in bearings 12 and 13 by means of a shaft 14 provided at one end of said frame 11 and a hollow shaft 15 provided at the rear of said frame.

Air for driving the rotor 9 is supplied by a nozzle 16 through the hollow shaft 15, said air first passing through a filtering chamber 17 provided with a filtering screen 18.

It is to be understood that the speed of the gyro rotor 9 is maintained substantially constant by some suitable means which are not shown in the drawings, but which may be, as previously stated, of the type shown in the aforesaid Reichel Patent No. 2,249,914.

Secured to the opposite end of shaft 14 and movable therewith when the gyroscope precesses, is a forked member 19 which engages one end of a rod 20, the other end of said rod 20 being attached to a lever arm 21 secured to a hollow shaft 22 which projects to the front face of the indicating instrument and which has attached thereto an indicating dial 23 rotatable therewith upon precession of the gyroscope.

Figure 5:
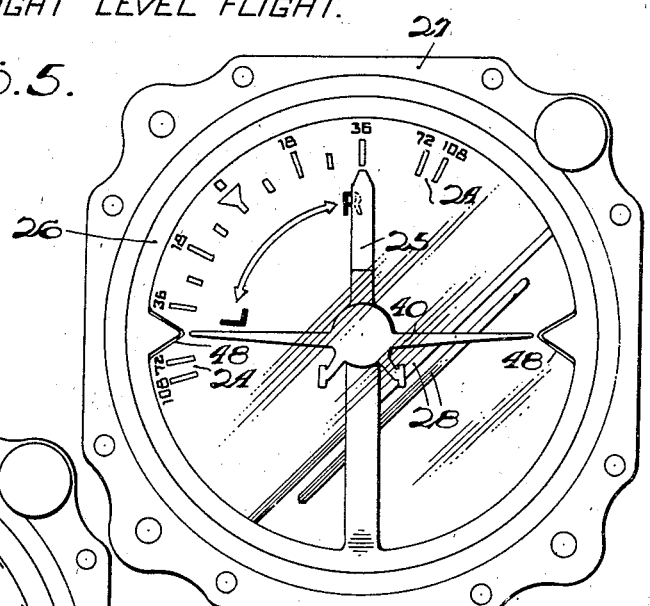
Fig. 5 is a view similar to Fig. 4, showing the indication presented during a right turn at the correct angle of bank.
Figure 6:
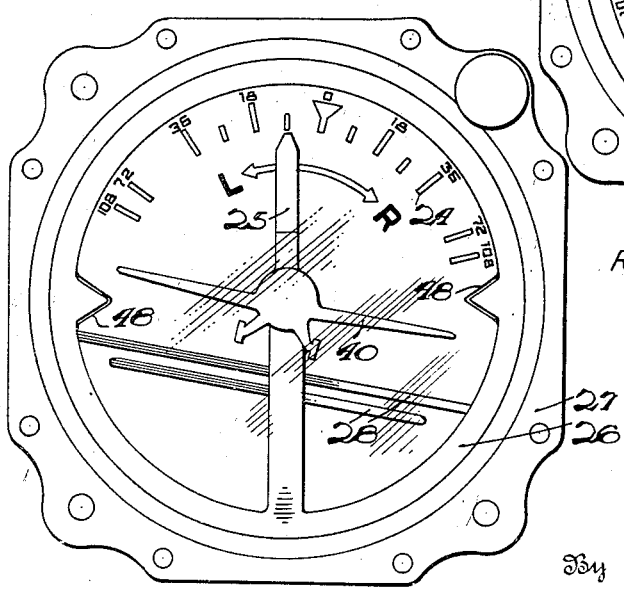
Fig. 6 is another view similar to Fig. 4, showing the indication presented during a left turn at an incorrect angle of bank, i. e., a left turn that is too flat.

The dial 23 has a scale 24 thereon calibrated to indicate the rate of turn in degrees per minute. The scale 24 cooperates with a fixed index or pointer 25 attached to a ring 26 at the front of the instrument casing 27, as shown in Figs. 4 to 6, inclusive. One or more horizontal lines 28 are also marked on the lower portion of dial 23 and serve as horizon reference indicating means in a manner which will be explained hereinafter.

Damping means are provided for preventing oscillation of the dial 23 and, in the form shown, comprise a stationary dash-pot cylinder 29 provided with an orifice 30 at the closed end thereof and having a movable piston 31 therein carried by a piston rod 32 which extends through the open end of cylinder 29 and is pivotally attached at 33 to an arm 34 secured to or formed integrally with the forked member 19 carried by the shaft 14 of the precession frame 11.

In accordance with the present invention, means are now provided for applying to the precession frame 11 an opposing torque having the required tangent-law characteristic to centralize the gyroscope and to provide an accurate measure of the rate of turn to be indicated by the instrument on the scale 24 of the dial 23. In the illustrated embodiment said means comprise a pair of oppositely wound coil springs 35 and 36 which are wound around the shaft 14 in the manner of hair springs, with the inner end of each spring attached to said shaft 14 and the outer end of each spring attached to a stationary collar 37, which is provided on its periphery with two sets of circumferentially spaced adjustable curb screws 38 and 39 projecting radially inwardly of the collar 37 to engage the springs 35 and 36 and serving as stops for said springs as the latter alternately unwind during precession of the gyro rotor with its frame 11, i. e., spring 35 unwinds while the spring 36 winds up when the gyroscope precesses in one direction, and spring 36 unwinds while spring 35 winds up when the gyroscope precesses in the opposite direction.

As the springs 35 and 36 respectively unwind they bear against their respective stops or screws 38 and 39 in progression so that the unwinding spring is progressively shortened as the amount of precession increases. In this manner the springs 35 and 36 exhibit a constantly increasing slope for progressively greater deflection of the gyro rotor 9 about its precession axis which is coincident with the shaft 14 of the precession frame 11. By adjusting the curb screws or stops 38 and 39, the characteristics of the springs can be made to substantially conform to the tangent law shown in Equation 8.

Means are also provided for showing the condition of proper bank of the aircraft on which the rate of turn meter is carried and the rate of turn of which is to be measured. In the embodiment shown, said bank indicating means comprise an indicating member in the form of a rotatable miniature airplane 40 positioned in front of the dial 23 horizontally across the center thereof and just above the horizon reference lines 28. The miniature airplane 40 is attached to and rotatable with a shaft 41 which extends through the hollow shaft 22, said shaft 41 having attached thereto or formed integrally therewith an arm 42 carrying a pin or rod 43 which engages a forked member 44.

The forked member 44 is attached to and rotatable with an actuating shaft 45 journalled in suitable bearings (not shown) for rotation about an axis parallel to the axis of shafts 22 and 41 and, in the present instance, parallel to the longitudinal or banking axis of the craft on which the instrument is mounted.

Attached to said shaft 45 for actuating the same when the craft banks or rolls about its longitudinal axis is a simple pendulum comprising a weight 46 attached to an arm 47 carried by the shaft 45.

It will be seen that when the craft banks or rolls about its longitudinal axis without turning about its vertical axis, the pendulum, 46, 47, will actuate the miniature airplane 40 to cause angular deflection thereof with respect to the horizon reference lines 28 which are stationary at such time and with respect to a pair of fixed reference marks or pointers 48 secured to or formed integrally with the ring 26 attached to the instrument casing 27.

In order to dampen the movements of the pendulum 46, 47 the shaft 45 is connected through a lever 49 to a piston 50 of a dash-pot cylinder 51.

It is to be noted that the connection between the pendulum 46, 47 and the shaft 41 which carries the miniature airplane 40 is such that when the instrument is tilted to the right or clockwise as viewed in Fig. 3, corresponding to a right bank, said miniature airplane 40 will likewise move to the right or clockwise with respect to the horizon reference lines 28 and reference marks 48 through approximately the same angle as the angle of bank.

When the airplane on which the instrument is mounted is flying a straight course, but is banked to the right, for example, the horizon reference lines 28 remain horizontal with respect to the instrument case (since the craft is not turning). The pendulum 46, 47, however, turns to the left or counter-clockwise through an angle equal to the actual angle of bank, thereby turning the miniature airplane 40 to the right or clockwise through the same angle. If there are transient accelerations present caused by side slipping during a bank without a turn, such accelerations might be great enough to deflect the pendulum 46, 47 to indicate a bank in the opposite direction. Such accelerations, however, do not exist in steady flight at constant speed even though one wing of the craft may be lower than the other.

If the airplane is flying at calibration speed and is making a properly banked turn at any rate within calibration range, the miniature airplane 40 remains horizontal with respect to the reference marks 48 in view of the fact that the resultant of centrifugal force and gravity is at right angles to the transverse axis of the airplane, but as previously explained, the gyroscope and, therefore, the horizon lines 28 carried by the dial 23 turn through an angle equal to the proper banking angle because $\theta = \phi$ according to Equation 5, thus keeping the horizon lines 28 horizontal with respect to the ground. Accordingly, under these conditions, the position of the miniature airplane 40 relative to the horizon reference lines 28 indicates the angle of bank as shown in Fig. 5 of the drawings, while the pointer 25 indicates the rate of turn on the scale 24 of dial 23.

Consideration will now be given to a condition under which the airplane is flying at calibration speed, but is making an improperly banked turn. For this purpose, reference is to be made to Fig. 2 which is a diagrammatic showing of such a condition.

$\theta_D$, the correct banking angle, is given as $$\theta_D = \tan^{-1} \frac{V\omega}{g} \quad \text{(Equation 3)}$$

$\theta_G$, the gyro deflection involves the simultaneous solution of the following equations:

$$T_p = \frac{I_s}{g} \omega_s \omega \cos \alpha \quad (1)$$

$$T_s = \frac{\omega_s I_s}{V} \tan \theta_G \quad (8)$$

$T_p = T_s$ (for equilibrium)

$$\alpha = \theta_G - \theta_I$$

where $\theta_I$ = actual angle of bank

This gives the following:

$$\frac{\omega_s I_s}{V} \tan \theta_G = \frac{I_s}{g} \omega_s \omega \cos (\theta_G - \theta_I)$$

or $$\tan \theta_G = \frac{V\omega}{g} \cos (\theta_G - \theta_I) \quad (9)$$

Unfortunately, Equation 9 cannot be solved literally for $\theta_G$, but by inspection it is obvious that if $\theta_G - \theta_I$ be very small as, for example, not more than six degrees, then $$\tan \theta_G = \frac{V\omega}{g} \text{ (nearly)}$$

or $$\theta_G = \tan^{-1} \frac{V\omega}{g} \text{ (nearly)}$$

therefore, $$\theta_G = \theta_D \text{ (nearly)}$$

It is to be noted that if $\theta_G - \theta_I = 6°$ then $\theta_G$ differs from $\theta_D$ by about 10′ of arc. Actually $(\theta_G - \theta_I)$ can be as great as 15° without serious error.

Now, still referring to Fig. 2, the pendulum 46 aligns itself to the dynamic vertical (C—C), making an angle $\beta$ with respect to the instrument vertical (B—B). The miniature airplane 40 is thus rotated through the same angle (angle $\gamma$). But $$\gamma = \beta = \theta_D - \theta_I = \theta_G - \theta_I \text{ (nearly)}$$

Now, taking the angles from axis B—B, the angle of the horizon lines 28 is $\theta_G + 90°$, or, as shown above, $\theta_D + 90°$ (nearly)

while the angle of the miniature airplane 40 is $\gamma + 90°$ or, as above $\alpha + 90°$ and the angle between the horizon lines 28 and the miniature airplane is $$\theta_D + 90 - (\alpha + 90) = \theta_D - \alpha \text{ (nearly)}$$

But $$\alpha = \theta_G - \theta_I \text{ and } \theta_D = \theta_G \text{ (nearly)}$$

Therefore, the angle between the horizon lines 28 and the miniature airplane 40 is $$\theta_G - (\theta_G - \theta_I) = \theta_I \text{ (nearly)}$$

which is the actual angle of bank.

Accordingly, it is seen that even under the condition when the airplane on which the instrument is mounted is flying at calibration speed but is making an incorrectly banked turn, the position of the miniature airplane 40 relative to the horizon lines 28 indicates the angle of bank very nearly correctly, the accuracy being sufficient for all practical purposes. Such an indication is shown in Fig. 6 of the drawings.

When the airplane is flying at other than the calibrated speed and is making a properly banked turn, the banking angle indicated will be nearly equal to the correct angle of bank at calibration speed, while the actual angle of bank will be that related to the actual speed, so that a small error does exist which depends on the difference between the actual airspeed and the calibration airspeed. At the extremes of the recommended speed range, as explained hereinbefore, this error amounts to about 4° under the worst conditions.

When the airplane is flying at other than calibration speed and is making an incorrectly banked turn, the indication on the instrument will be about the same as when making a properly banked turn at other than calibration speed, except that a very slight additional error is introduced by a slight increase in the value of the angle as previously explained. The total error, however, does not exceed 5°.

There is thus provided a novel turn meter and bank indicator which correctly indicates the rate of turn of a craft and also indicates the angle of bank of said craft while turning.

Although only one embodiment of the invention has been illustrated and described, various changes in the construction, form and relative arrangement of parts, which will now appear to those skilled in the art, may be made without departing from the spirit or the scope of the invention. Reference is, therefore, to be had to the appended claims for a definition of the limits of the invention.

What is claimed is:

1. A combined rate of turn meter and bank indicator for aircraft, comprising a rotatable dial having a scale thereon calibrated in degrees of turn and also having means thereon representing the horizon, an indicating member simulating an aircraft and cooperating with said horizon means to indicate bank, a pointer cooperating with the scale of said dial to indicate rate of turn of the aircraft, reference indicating means also cooperating with said aircraft simulating member to indicate the amount of error in the angle of bank when said aircraft is making an incorrectly banked turn, a pendulum responsive to banking of the craft for actuating said aircraft simulating member, a rate of turn responsive gyroscope mounted for precession in response to turning of the craft for actuating said rotatable dial to indicate the rate of turn on the scale thereof, and yielding means opposing the precession of said gyroscope as a function of the tangent of the angle of precession so that said angle of precession is equal to the angle of bank of said aircraft, whereby the position of said aircraft simulating member with respect to said horizon means on said dial indicates the angle of bank during a turn, and the position of said member with respect to said reference indicating means indicates the amount of error in the angle of bank when said aircraft is making an incorrectly banked turn, said yielding means comprising a pair of oppositely wound coil springs arranged to apply a centralizing torque on said gyroscope when the latter precesses and in such a manner that one winds up while the other unwinds to oppose the precession of said gyroscope in one direction, and the other winds up while the one unwinds to oppose the precession of said gyroscope in the opposite direction, and a set of adjustable stops circumferentially spaced around and cooperating with each of said coil springs so that the latter abut their respective stops during unwinding thereof to impart thereto the characteristic of opposing the precession of said gyroscope as a function of the tangent of the angle of precession of the gyroscope.

2. A combined rate of turn meter and bank indicator for aircraft, comprising a rate of turn responsive gyroscope mounted for precession in response to the turn of said craft, indicating means actuated by said gyroscope for indicating the rate of turn of said craft, means responsive to the banking of said craft, indicating means including means actuated by said bank responsive means and means actuated by said gyroscope, and yielding means opposing the precession of said gyroscope as a function of the tangent of the angle of precession so that said angle of precession is equal to the angle of bank of said aircraft, whereby said rate of turn indicating means indicate the exact rate of turn and said second-named indicating means indicate the angle of bank of said craft and also the error in the banking angle of the craft when the latter is making an incorrectly banked turn, said yielding means comprising a pair of oppositely wound coil springs connected to apply a centralizing torque on the gyroscope when the latter precesses, one of which winds up while the other unwinds to oppose the precession of said gyroscope in one direction, and the other winds up while the one unwinds to oppose the precession of said gyroscope in the opposite direction, and a set of adjustable stops circumferentially spaced around and cooperating with each of said coil springs, respectively, so that the latter abut their respective stops during unwinding thereof to impart thereto the characteristic of opposing the precession of said gyroscope as a function of the tangent of the angle of precession of the gyroscope.

3. A rate of turn responsive device for aircraft and the like, comprising a two-degree-of-freedom gyroscope mounted for precession in response to a turn of the craft about an axis thereof, and means yieldingly opposing the precession of said gyroscope as a function of the tangent of the angle through which it precesses for a given rate of turn, whereby said angle of precession is an accurate measure of the rate of turn of said craft, said opposing means comprising a pair of oppositely wound coil springs connected to apply a centralizing torque on said gyroscope when the latter precesses and arranged in such a manner that one winds up while the other unwinds to oppose the precession of said gyroscope in one direction, and the other winds up while the one unwinds to oppose the precession of said gyroscope in the opposite direction.

4. A combined rate of turn meter and bank indicator for aircraft, comprising a rotatable dial having a scale thereon calibrated in degrees of turn per unit of time and also having means thereon representing the horizon, an indicating member simulating an aircraft and cooperating with said horizon means to indicate bank, a pointer cooperating with the scale of said dial to indicate the rate of turn of the aircraft, reference indicating means also cooperating with said aircraft simulating member to indicate the amount of error in the angle of bank when said aircraft is making an incorrectly banked turn, a pendulum responsive to banking of the craft for actuating said aircraft simulating member, a rate of turn responsive gyroscope mounted for precession in response to turning of the craft for actuating said rotatable dial to indicate the rate of turn on the scale thereof, and means actuated upon precession of said gyroscope for applying to said gyroscope a force opposing said precession, which force is proportional to the tangent of the angle of precession, so that said angle of precession is equal to the angle of bank of said aircraft, whereby the position of said aircraft simulating member with respect to said horizon means on said dial indicates the angle of bank during a turn, and the position of said member with respect to said reference indicating means indicates the amount of error in the angle of bank when said aircraft is making an incorrectly banked turn.

5. A combined rate of turn meter and bank indicator for aircraft, comprising a rotatable dial having a scale thereon calibrated in degrees of turn per unit of time and also having means thereon representing the horizon, an indicating member simulating an aircraft and operating with said horizon means to indicate bank, a pointer cooperating with the scale of said dial to indicate the rate of turn of the airrcraft, reference indicating means also cooperating with said aircraft simulating member to indicate the amount of error in the angle of bank when said aircraft is making an incorrectly banked turn, a pendulum responsive to banking of the craft for actuating said aircraft simulating member, a rate of turn responsive gyroscope mounted for precession in response to turning of the craft for actuating said rotatable dial to indicate the rate of turn on the scale thereof, a pair of oppositely acting springs actuated upon precession of said gyroscope for applying to said gyroscope a force opposing said precession, and means acting on said springs for making said opposing force proportional to the tangent of the angle of precession of said gyroscope so that said angle of precession is equal to the angle of bank of said aircraft, whereby the position of said aircraft simulating member with respect to said horizon means on said dial indicates the angle of bank during a turn, and the position of said member with respect to said reference indicating means indicates the amount of error in the angle of bank when said aircraft is making an incorrectly banked turn.

6. A combined rate of turn meter and bank indicator for aircraft, comprising a rate of turn responsive gyroscope mounted for precession in response to a turn of said craft, indicating means actuated by said gyroscope for indicating the rate of turn of said craft, means responsive to the banking of said craft, other indicating means adjacent to and in cooperative indicating relation with said first indicating means and including means actuated by said bank responsive means and means actuated by said gyroscope, and means actuated upon precession of said gyroscope for applying to said gyroscope a force opposing said precession, which force is proportional to the tangent of the angle of precession so that the amount of precession of the gyroscope is equal to the angle of bank of said aircraft, whereby said rate of turn indicating means indicate the exact rate of turn, and said second-named indicating means indicate the angle of bank of said craft and also the error in the banking angle of the craft when the latter is making an incorrectly banked turn.

7. A combined rate of turn meter and bank indicator for aircraft, comprising a rate of turn responsive gyroscope mounted for precession in response to a turn of said craft, indicating means actuated by said gyroscope for indicating the rate of turn of said craft, means responsive to the banking of said craft, other indicating means adjacent to and in cooperative indicating relation with said first indicating means and including means actuated by said bank responsive means and means actuated by said gyroscope, a pair of oppositely acting springs actuated upon precession of said gyroscope for applying to said gyroscope a force opposing said precession, and means acting on said springs for making said opposing force proportional to the tangent of the angle of precession of said gyroscope so that said angle of precession is equal to the angle of bank of said aircraft, whereby said rate of turn indicating means indicate the exact rate of turn and said second-named indicating means indicate the angle of bank of said craft and also the error in the banking angle of the craft when the latter is making an incorrectly banked turn.

8. A rate of turn responsive device for aircraft and the like, comprising a two-degree-of-freedom gyroscope mounted for precession in response to a turn of the craft about one of its axes, and means actuated upon precession of said gyroscope for applying to said gyroscope a force opposing said precession, which force is proportional to the tangent of the angle through which said gyroscope precesses, whereby said angle is an accurate measure of the rate of turn of said craft.

9. A rate of turn responsive device for aircraft and the like, comprising a two-degree-of-freedom gyroscope mounted for precession in response to a turn of the craft about one of its axes, a pair of oppositely acting springs actuated upon precession of said gyroscope for applying to said gyroscope a force opposing said precession, and means acting on said springs for making said opposing force proportional to the tangent of the angle through which said gyroscope precesses, whereby said angle is an accurate measure of the rate of turn of said craft.

10. A combined rate of turn meter and bank indicator for aircraft, comprising a gyroscope mounted for precession in response to a turn of said craft, indicating means actuated by said gyroscope for indicating the rate of turn of said craft, said indicating means including horizon reference indicating means for indicating the angle of bank of said craft while turning, and means actuated upon precession of said gyroscope for applying to said gyroscope a force opposing said precession, which force is proportional to the tangent of the angle of precession of said gyroscope so that said angle of precession is equal to said angle of bank of said aircraft, whereby said indicating means indicate the exact rate of turn and also the angle of bank of said craft while turning.

11. A combined rate of turn meter and bank indicator for aircraft, comprising a gyroscope mounted for precession in response to a turn of said craft, indicating means actuated by said gyroscope for indicating the rate of turn of said craft, said indicating means including horizon reference indicating means for indicating the angle of bank of said craft while turning, a pair of oppositely acting springs actuated upon precession of said gyroscope for applying to said gyroscope a force opposing said precession, and means acting on said springs for making said opposing force proportional to the tangent of the angle of precession of said gyroscope so that said angle of precession is equal to said angle of bank of said aircraft, whereby said indicating means indicate the exact rate of turn and also the angle of bank of said craft while turning.

PAUL A. NOXON.